United States Patent
Ludois et al.

(10) Patent No.: US 9,934,903 B2
(45) Date of Patent: Apr. 3, 2018

(54) INTEGRATED CAPACITOR AND INDUCTOR WITH LOW PARASITIC INDUCTANCE

(71) Applicant: Wisconsin Alumni Research Foundation, Madison, WI (US)

(72) Inventors: Daniel Colin Ludois, Madison, WI (US); Andy Lee Schroedermeier, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 328 days.

(21) Appl. No.: 14/826,572

(22) Filed: Aug. 14, 2015

(65) Prior Publication Data

US 2017/0047161 A1 Feb. 16, 2017

(51) Int. Cl.

| | |
|---|---|
| *H01F 38/14* | (2006.01) |
| *H01F 27/24* | (2006.01) |
| *H01F 27/28* | (2006.01) |
| *H01G 4/005* | (2006.01) |
| *H01G 4/008* | (2006.01) |
| *H01G 4/228* | (2006.01) |
| *H01G 4/40* | (2006.01) |
| *H01G 4/30* | (2006.01) |

(52) U.S. Cl.
CPC .............. *H01F 38/14* (2013.01); *H01F 27/24* (2013.01); *H01F 27/2823* (2013.01); *H01G 4/005* (2013.01); *H01G 4/008* (2013.01); *H01G 4/228* (2013.01); *H01G 4/40* (2013.01); *H01F 2038/146* (2013.01)

(58) Field of Classification Search
CPC ...... H01F 27/24; H01F 27/2823; H01F 38/14; H01F 38/146; H01G 4/005; H01G 4/008; H01G 4/228; H01G 4/40
USPC ........................................................ 361/270
See application file for complete search history.

(56) References Cited

U.S. PATENT DOCUMENTS

| | | |
|---|---|---|
| 4,837,659 A | 6/1989 | Roshen et al. |
| 4,922,156 A | 5/1990 | Turcotte et al. |
| 5,274,346 A | 12/1993 | Izu et al. |
| 5,838,214 A | 11/1998 | Goel et al. |
| 6,469,596 B2 | 10/2002 | Hull et al. |

(Continued)

FOREIGN PATENT DOCUMENTS

| | | |
|---|---|---|
| EP | 1677419 A1 | 5/2006 |
| JP | 2003174347 A | 6/2003 |
| RU | 2178936 C2 * | 1/2002 |

OTHER PUBLICATIONS

Machine Translation of Russian Patent Document RU 2178936 C2, Jan. 2002.*

*Primary Examiner* — Thienvu Tran
*Assistant Examiner* — Kevin J Comber
(74) *Attorney, Agent, or Firm* — Boyle Fredrickson, S.C.

(57) ABSTRACT

A combination capacitor and inductor employ a common volume of high permeability material for energy-storing electrical and magnetic fields thereby reducing the bulk of these components with respect to separate components of comparable value. Capacitor conductors are arranged so that while proximate to the high permeability material they provide countervailing current flows to minimize parasitic inductance exacerbated by the high permeability material.

17 Claims, 6 Drawing Sheets

(56) References Cited

U.S. PATENT DOCUMENTS

| | | | |
|---|---|---|---|
| 6,569,346 B1* | 5/2003 | Tung | C04B 35/2658 |
| | | | 252/62.56 |
| 6,985,064 B1 | 1/2006 | Loukas | |
| 7,436,281 B2 | 10/2008 | Brennan et al. | |
| 7,492,240 B1 | 2/2009 | Cho et al. | |
| 2006/0139971 A1 | 6/2006 | Suzuki | |
| 2008/0094860 A1 | 4/2008 | Falk | |
| 2010/0123582 A1* | 5/2010 | Smith | G08B 13/2414 |
| | | | 340/572.3 |
| 2012/0038434 A1 | 2/2012 | Harrison | |

* cited by examiner

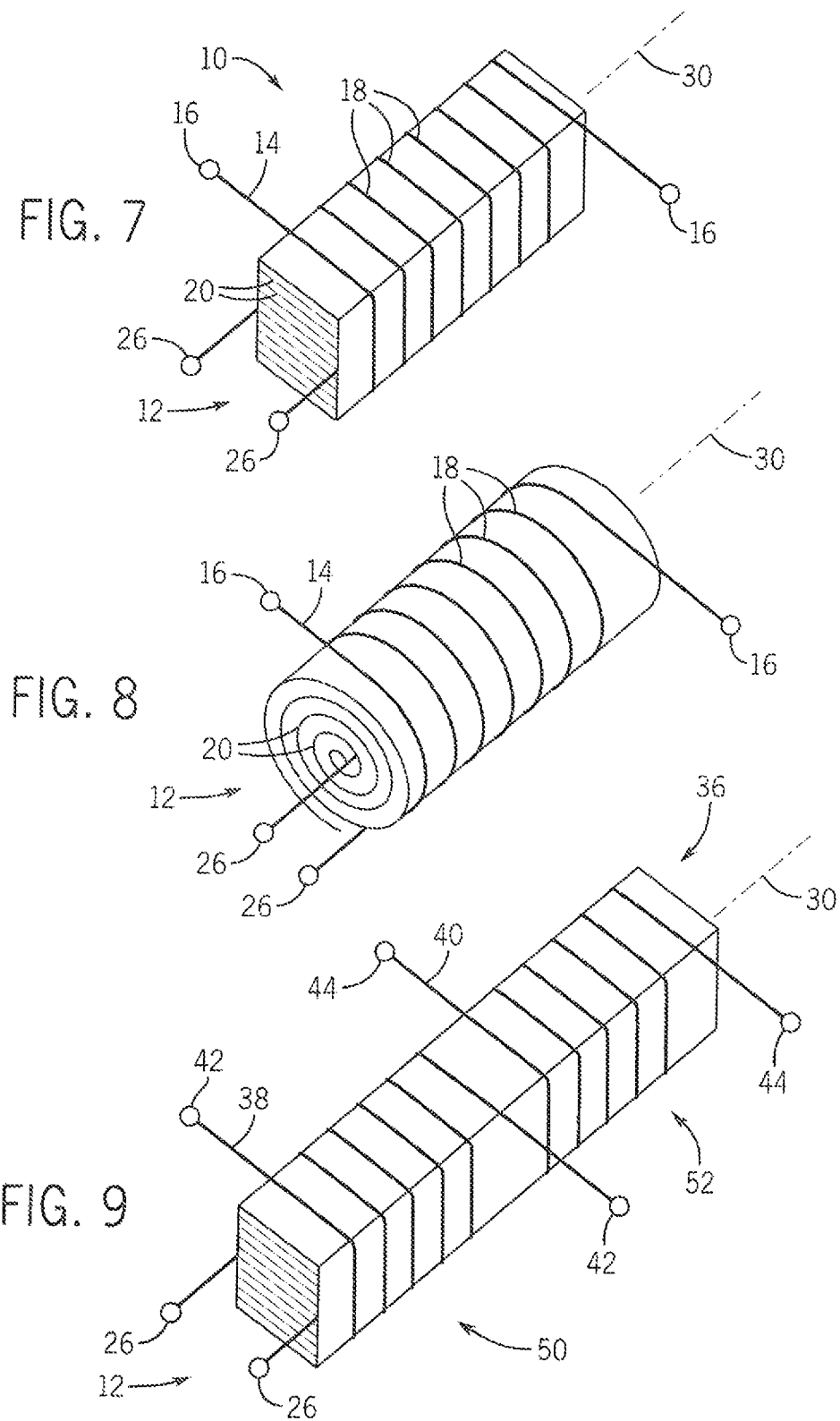

INTEGRATED CAPACITOR AND INDUCTOR WITH LOW PARASITIC INDUCTANCE

STATEMENT REGARDING FEDERALLY SPONSORED RESEARCH OR DEVELOPMENT

CROSS REFERENCE TO RELATED APPLICATION

BACKGROUND OF THE INVENTION

The present invention relates to capacitors and inductors used in electrical circuits and in particular to an integrated capacitor and inductor sharing energy storage volumes.

Inductors and capacitors are fundamental building blocks in many common electrical devices. Unlike electrical resistors, another common building block component, inductors and capacitors can provide for electrical energy storage Inductors provide energy storage in the form of a magnetic field in the vicinity of a current-carrying conductor. The conductor is normally formed into a coil of multiple loops to concentrate the generated magnetic flux within the coil thereby increasing the inductance and energy storage. The coil may be further wrapped about a core of high magnetic permeability, such as a ferromagnetic or ferrimagnetic material, to further increase the coil's inductance.

Capacitors provide for energy storage in the form of an electric field generated between two plates of different voltage separated by an insulator. The total area between the plates and their proximity may be increased to increase the capacitance and enemy storage. The insulator between the plates may further be selected to be a dielectric material, such as a plastic or ceramic, to further increase the capacitance.

In many applications of inductors and capacitors, in both low-powered and high-powered electronics, the physical size of the inductor and capacitor may be a limiting factor in reducing the size of the circuit.

Co-pending U.S. application Ser. No. 14/197,580 filed Mar. 5, 2014, assigned to the assignee of the present invention and hereby incorporated by reference, describes an inductor and capacitor configured to share an energy storage volume thereby substantially reducing the bulk of the device. In this regard, the capacitor may incorporate a high magnetic permeability material into its structure so that the capacitor may replace the normal high permeability core of the inductor.

SUMMARY OF THE INVENTION

The present inventors have recognized that the process of increasing the magnetic permeability of the material within the capacitor structure with the purpose of creating an inductor core can undesirably increase a parasitic equivalent series inductance (ESL) of the capacitor degrading the capacitor performance at high frequencies. The present invention employs a loop-back terminal structure to moderate ESL in designs of this kind. The loop-back terminals of the capacitor aim to reduce the permeable volume enclosed by the capacitor conductors and minimize the net magnetic field induced by the capacitor current.

Specifically, the present invention provides a combined inductor and capacitor having an inductor providing a conductor extending between a first and second terminal point through multiple loops defining a surrounded volume and a capacitor positioned within the surrounded volume and providing a capacitor structure including opposed conductive plates attached by conductors, respectively, to a third and fourth terminal and an insulator separating the opposed conductive plates. A high magnetic permeability material is distributed within the capacitor structure comprised of at least one of a ferromagnetic and ferrimagnetic material. The conductive plates and conductors are arranged so that current flow between the third and fourth terminals proximate to the high magnetic permeability material provides countervailing canceling magnetic fields within the high magnetic permeability material.

It is thus a feature of at least one embodiment of the invention to provide a low-bulk combined inductor capacitor having low equivalent series inductance at the capacitor terminals.

The capacitor plates may include a plurality of plates separated by a plurality of insulators in a stack extending along a first axis, with the plates extending parallel to a second axis perpendicular to the first axis, and a first subset of the plates may connect at first edges to a first conductive end cap and a second subset of the plates interleaved with the first subset of plates may connect at second edges to a second conductive end cap opposite the first conductive panel. The third terminal may connect to the first end cap and the fourth terminal may connect via a loop-back conductor to the second end cap, the loop-back conductor passing proximate to the high magnetic permeability material along the second axis toward the first end cap. The multiple loops of the inductor may spiral about an axis perpendicular to the first axis It is thus a feature of at least one embodiment of the invention to provide an extremely simple capacitor structure with low equivalent series inductance.

Alternatively, the surrounded volume may be substantially toroidal and the capacitor plates may extend parallel to an axis of the toroid, and the first and second conductive end caps may provide opposite bases of a toroidal capacitor structure each respectively to interconnect different subsets of the capacitor plates. At least one conductive ring may conform to an outer periphery of the toroidal capacitor structure or an inner diameter of the toroidal capacitor structure electrically connected to the second conductive end cap. The third terminal may connect to the first end cap and the fourth terminal may connect to at least one conductive ring, and the multiple loops of the inductor may spiral about the toroid to pass repeatedly through the inner diameter of the toroid and around the outer periphery.

It is thus a feature of at least one embodiment of the invention to provide a toroidal combined inductor and capacitor with low series resistance.

Alternatively, when the surrounded volume is substantially toroidal, the capacitor plates may extend perpendicularly to an axis of the toroid and the first conductive end cap may be a conductive ring conforming to an outer periphery of a toroidal capacitor structure and the second conductive end cap may be a conductive ring conforming to an inner diameter of the toroidal capacitor structure. The structure may further include at least one conductive base plate conforming to at least one base of the toroidal capacitor structure and electrically connected to at least one of the end caps to communicate electricity with at least one of the third and fourth terminals. The multiple loops of the inductor may spiral about the toroid to pass repeatedly through the inner diameter of the toroid and around the outer periphery.

It is thus a feature of at least one embodiment of the invention to provide a toroidal combined inductor and capacitor that may make use of a spiral winding of the capacitor plates.

Alternatively, the capacitor plates may include at least two conductive plates separated by an insulator rolled in spiral about the first axis to create a laminated, or "tape wound" structure with laminations separated along lines of radius from the first axis and the third terminal may connect to at least one plate and the fourth terminal may connect to at least a second plate separated from the first plate by the insulator so that instantaneous current flow in the first and second plates provides countervailing canceling magnetic fields. In this case the multiple loops of the inductor spiral about the first axis but are decoupled from ESL of the capacitor terminals.

It is thus a feature of at least one embodiment of the invention to provide a simple capacitor structure that inherently provides countervailing current flows and/or whose layout provides minimal enclosed permeable material The first and second terminals may be galvanically isolated from the third and fourth terminals.

It is thus a feature of at least one embodiment of the invention to provide a combined inductor/capacitor with inductive and capacitive elements that may be used independently in contrast, say, to the systems that may use parasitic capacitances or inductance having a fixed predetermined configuration to the element on which they are parasitic.

The combined inductor and capacitor may have plates that extend along an axis substantially parallel to magnetic field lines from the inductor.

It is thus a feature of at least one embodiment of the invention to provide a combined inductor and capacitor with minimized induced eddy currents in the capacitor plates by making the plates thin and ensuring that plates run in parallel to the magnetic field lines.

The combined inductor and capacitor where the high magnetic permeability material operates to increase an inductance of the inductor by a factor of no less than 2 when compared to the inductance of the inductor without the high magnetic permeability material.

It is thus a feature of at least one embodiment of the invention to provide a specially constructed capacitor that may serve as a high permeability inductor core. The high permeability material may be distributed in a plurality of layers in the capacitor structure.

It is thus a feature of at least one embodiment of the invention to provide a simple method of integrating high permeability material into a capacitor structure during manufacture.

The high permeability material may be iron or an iron alloy with a nonferrous metal coating. It is thus a feature of at least one embodiment of the invention to permit a flexible combination of ferrous and nonferrous metals to provide both conduction and high permeability in the conductive plates of the capacitor.

The combined inductor and capacitor may have a high magnetic permeability material that is a plurality of granules incorporating inter-granular gaps of low magnetic permeability.

It is thus a feature of at least one embodiment of the invention to promote magnetic energy storage of the inductor within the same surrounded volume as the electrostatic energy storage of the capacitor.

The combined inductor and capacitor may contain conductive plates that comprise a material selected from the group consisting of copper and aluminum.

It is thus a feature of at least one embodiment of the invention to provide a combined inductor and capacitor that may use highly conductive yet low permeability materials.

The insulator may be a dielectric material increasing a capacitance of the capacitor by at least a factor of two when compared to the capacitor without the dielectric material.

It is thus a feature of at least one embodiment of the invention to make use of the capacitor insulators as well as conductors for the purpose of increasing magnetic permeability of a core formed by the capacitor.

The insulator may incorporate a granular high magnetic permeability material selected from the group consisting of ferromagnetic materials and ferrimagnetic materials.

It is thus a feature of at least one embodiment of the invention to provide a method of augmenting the permeability of common insulators that may be used in the capacitor.

The capacitor structure may provide a ring of laminated conductive plates and insulators extending perpendicularly to an axis of the ring, the ring including radially inwardly extending pole elements and the inductor providing loops around each pole element. It is thus a feature of at least one embodiment of the invention to provide an integrated inductor and capacitor that form a stator of a motor.

These particular objects and advantages may apply to only some embodiments falling within the claims and thus do not define the scope of the invention.

BRIEF DESCRIPTION OF THE DRAWINGS

FIG. 7 is a perspective view of an alternative embodiment to that of FIG. 1 showing a linear form factor;

FIG. 8 is a perspective view of an alternative embodiment to FIG. 7 showing a spiral capacitor plate configuration;

FIG. 9 is a figure similar to that of FIG. 7 showing an embodiment of the invention producing a combination capacitor and transformer;

DETAILED DESCRIPTION OF THE PREFERRED EMBODIMENT

Embodiment I

These embodiments are taught in co-pending U.S. application Ser. No. 14/197,580 cited above.

Figure 1:
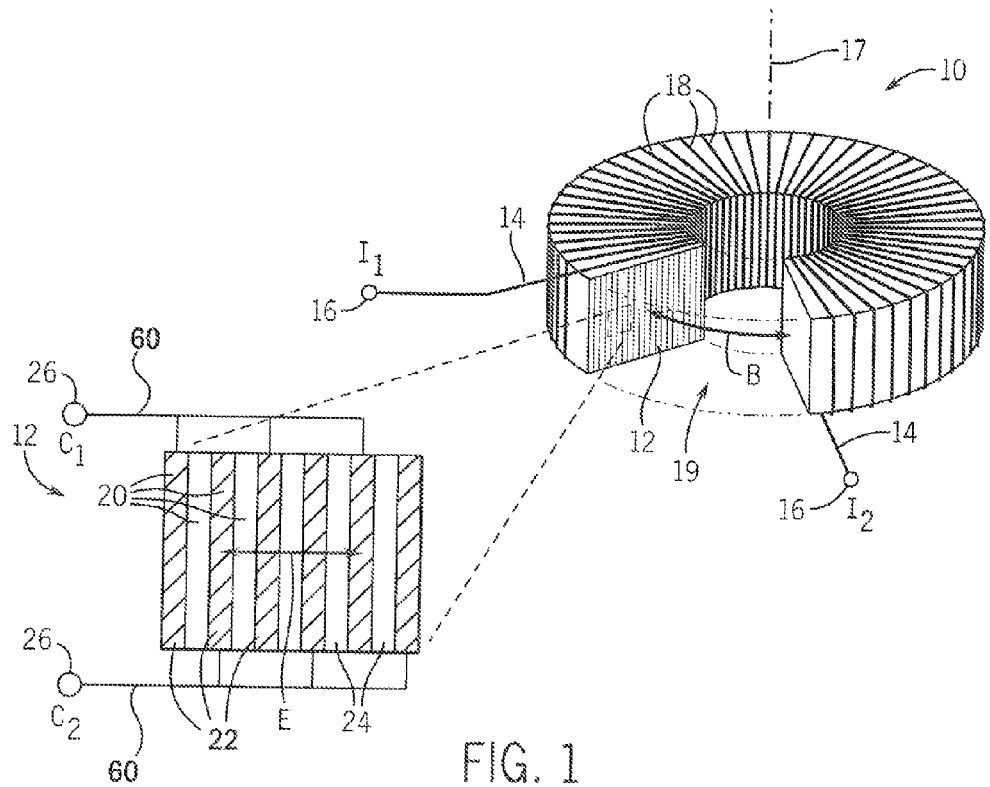
FIG. 1 is a perspective view of a first embodiment of the present invention having a toroidal form factor, the view providing a partial cutaway and an expanded cross-section of a capacitor layer structure.

Referring now to FIG. 1, an integrated capacitor inductor unit 10 of the present invention, in one example, may provide a toroidal core 12 having a generally rectangular cross-section, the latter cross-section which when swept in a circle about the toroid axis 17 defines a core volume 19.

The toroidal core 12 may be wrapped with a conductor 14 leading from a first terminal 16 (designated $I_1$) and passing, in each of multiple loops 18, through a center opening of the toroidal core 12 and around its outer periphery to terminate at a second terminal 16 (designated $I_2$). The loops 18 together form a solenoid around the core volume 19 so that electrical current passing through the conductor 14 from one terminal 16 to the other terminal 16 will generate a circumferential magnetic field B of flux lines passing through the core volume 19 and circling around the axis 17.

The toroidal core 12 comprises a number of planar layers 20 each extending circumferentially along and around axis 17 in height and length, respectively. Generally the planar layers 20 may be wound about a cylindrical form describing the center opening of the toroidal core 12 in a spiral outward to the outer circumferential periphery of the toroidal core 12 to provide a laminated structure.

The planar layers 20 include conductive plates 22 separated by interleaving insulating layers 24. Alternate conductive plates 22 may be attached to a first terminal 26 (designated $C_1$) and the remaining conductive plates 22 attached to a second terminal 26 (designated $C_2$). As such, the conductive plates 22 form opposite plates of a capacitor each separated by an insulating layer 24 so that voltage applied to the terminals 26 will generate a radial electric field E with field lines generally perpendicular to axis 17.

Figure 2:
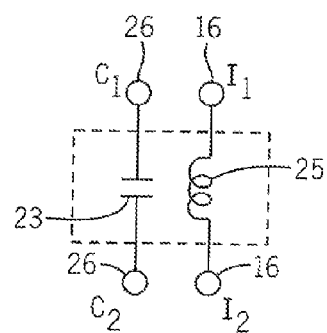
FIG. 2 is a simplified electrical schematic of the electrical equivalent of the embodiment of FIG. 1 showing an independent inductor and capacitor.

Referring now also to FIG. 2, it will be appreciated that the capacitance between terminals 26 provides a capacitor 23 electronically independent of the inductor 25 between terminals 16. Generally the current through the inductor 25 will be independent of the current through the capacitor 23 and the terminals 26 of the capacitor 23 need not be connected to the inductor 25 and may be separately accessed from the terminals 16 of the inductor 25 and vice versa. In this regard, the capacitor 23 and inductor 25 may be readily distinguished from a parasitic capacitor between inductor windings or parasitic inductance of capacitor leads.

In this embodiment, the electrical field E of the capacitor 23 will be perpendicular to the magnetic field B of the inductor 25 and the broad area of the conductive plates 22 (local surface normals) will also be perpendicular to the local magnetic field B reducing induced eddy currents in the conductive plates 22 caused by fluctuations of the magnetic field B such as may cause heating or energy loss.

Figure 3:
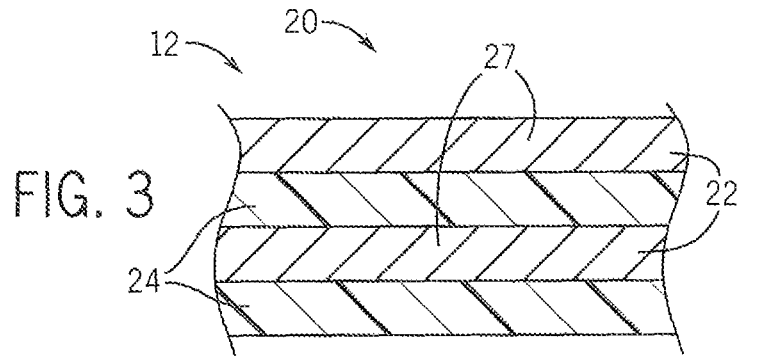
FIG. 3 is an expanded and rotated view of the cross-section of FIG. 1 showing a first embodiment using ferrous capacitor plates separated by an insulating dielectric.

Referring now to FIG. 3, in a first embodiment, the conductive plates 22 may be ferrous materials 27 such as a metallic iron or steel or other ferrous alloy or conductive ferromagnetic material. The ferrous high permeability material 27 may be ductile so that it may be wound in the annular form of toroidal core 12 as discussed above. The ferrous high permeability material 27 may provide both a conductive medium for the capacitor plates and a high permeability material increasing the inductance of the inductor 25.

The insulating layers 24 may be, for example, a polymer such as polyester, Teflon or the like to provide a dielectric material having a high relative permittivity, for example, greater than 2, to increase the capacitance between the conductive plates 22. Other dielectric materials known for use in capacitors may also be used.

Figure 4:
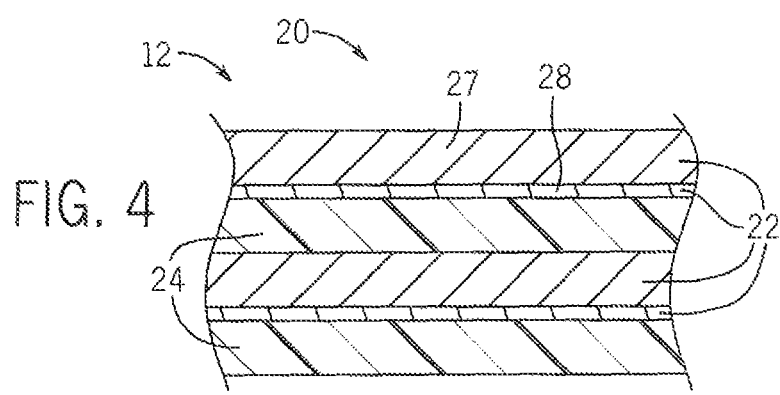
FIG. 4 is a figure similar to that of FIG. 3 showing laminated ferrous and nonferrous metals used for the capacitor plates.

Referring now to FIG. 4, in an alternative embodiment, the conductive plates 22 may be constructed of a ferrous high permeability material 27 laminated to a conductive nonferrous material 28 such as copper or aluminum together to provide a continuous conductive path between the conductive plates 22 and the terminals 26. Although only one side is shown laminated in FIG. 4, it will be appreciated that opposite sides and edges of the ferrous high permeability material 27 may be laminated with more conductive metal and other lamination orders and numbers may also be used.

Figure 5:
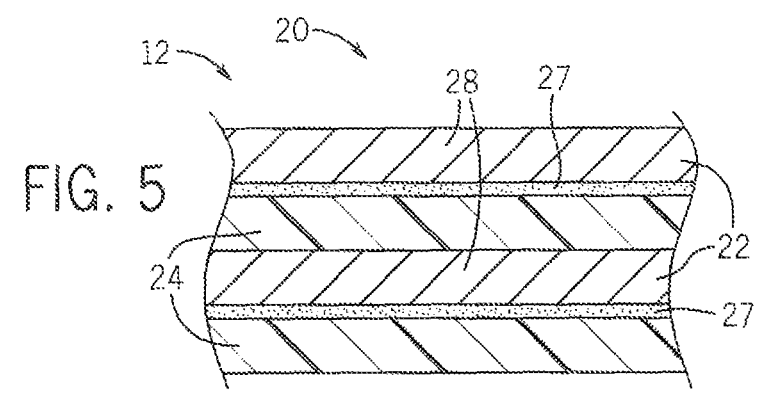
FIG. 5 is a figure similar to that of FIG. 3 showing the use of a high permeability layer interposed between capacitor plates and the insulating dielectric.

Referring now to FIG. 5, in an alternative embodiment, the conductive plates 22 may be a wholly nonferrous material such as aluminum or copper coated with a particulate or granularized high permeability material 27. The granularized high permeability material 27 provides gaps of low permeability and thus sites of magnetic energy storage. In this case, the granularized high permeability material 27 may be a ferrous material such as iron, an alloy, or an iron compound such as exhibits ferromagnetic properties for high permeability and/or a ferrite material such as magnesium and zinc ferrite or nickel-zinc ferrite, exhibiting ferrimagnetic properties and high permeability.

Alternatively, the granularized high permeability material 27 may be coated in a film on a surface of the insulating layer 24 or may be formed in its own layer to be laminated or layered between the insulating layer 24 and conductive plate 22. In each of the examples of FIGS. 4 and 5, the insulating layer 24 may be as described with respect to FIG. 3. Again although a coating of granularized type high permeability material 27 is shown on only one side of the conductive plate 22 it will be understood that the coating may be placed on both sides and edges of the conductive plate 22 attached to either the conductive plate 22 or the insulating layer 24.

Figure 6:
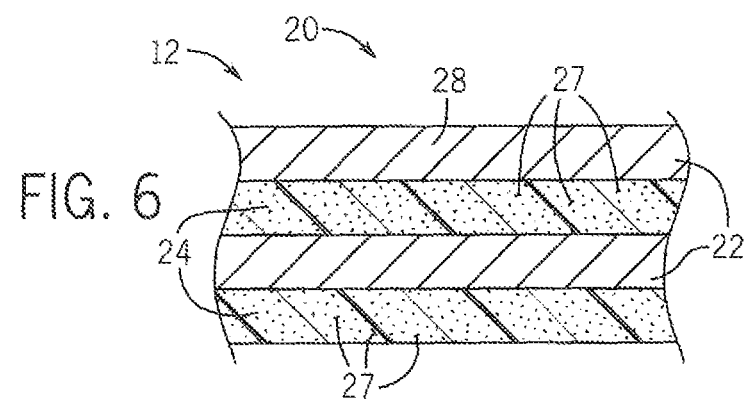
FIG. 6 is a figure similar to that of FIG. 3 showing nonferrous capacitor plates and a high permeability insulating layer having permeable and permittive properties.

Referring now to FIG. 6, any of the materials described with respect to FIGS. 3, 4, 5 may be used for the conductive plates 22 and the insulating layers 24 may incorporate a granularized high permeability material 27, for example, as a filler material in a polymer thermoplastic.

Generally the amount of high permeability material 27 will be such as to provide an effective amount of inductive energy storage by the inductor. Such an effective amount, for example, may increase the inductance of the inductor 25 by a factor of no less than 10 or at least no less than 2 in comparison to the inductor 25 operating without this material (for example, with an air core) but otherwise identical in construction. The high permeability material 27 will preferably have a permeability equal or exceeding that of nickel in the same magnetic environment. As noted, the high permeability material 27 may include ferrous materials including alloys and compounds as well as ferrite materials.

Generally the insulating layer 24, as noted, will be a dielectric, having a high relative permittivity of at least 2 and be in amount and quantity such as to increase the capacitance of the capacitor 23 by a factor of no less than two in comparison to the capacitor 23 operating without this material (for example, with an air gap between conductive plates 22) but otherwise identical in construction. The qualities of the dielectric of the insulating layer 24 will typically be at least as effective as polyethylene.

Referring now to FIG. 7, the integrated capacitor inductor unit 10 may alternatively provide a linear core 12 that extends without curvature along an axis 30. In this case the linear core 12 may have many planar parallel rectangular layers 20 extending along the axis 30.

It will be appreciated that the linear core 12 need not use planar laminations of layers 20 but for manufacturing convenience (as shown in FIG. 8) may provide layers 20 wrapped in a spiral about axis 30 to create a cylindrical core 12. A single pair of conductors and a single pair of insulators may be wrapped in an Archimedean spiral to create multiple layers simplifying the wiring of the capacitor 23. Generally the invention may provide an inductor with an inductance of at least 0.01 µH and/or a capacitor with a capacitance of least 0.0001 µF and in some embodiments an inductor with an inductance of at least 0.1 µH and a capacitor with a capacitance of at least 0.01 µF.

Referring now to FIG. 9, it will be appreciated that the same cores 12 described above may be used for the construction of a transformer 36. In one example, the core shown in FIG. 7 may be wrapped with two conductors 38 and 40 each passing in multiple loops around the core 12 and axis 30. The conductors 38 and 40 may each terminate in separate terminals 42 (for conductor 38) and terminals 44 (for conductor 40) to provide primary winding 50 and secondary winding 52 of the transformer 36.

In these applications, the cores 12 may be characterized as described above with respect to the permeability and permittivity with one exception. While the conductors 38 and 40 (and thus primary winding 50 and secondary winding 52) are intended to be fully flux coupled through the core 12 of the capacitor 23, they will exhibit some leakage flux giving them each an inductive quality. An increase in inductance of the conductors 38 and 40, however, is not necessarily desired, so the characteristics of the core 12 applicable to inductors, in increasing the inductance of inductors, will not apply to the cores 12 used for transformers Instead the permeability of the core 12 will generally be selected to reduce the leakage flux of the transformer 36, for example, in one measure to provide a short circuit leakage reactance impedance of less than 15 percent or the 5% of typical transformers.

Figure 10:
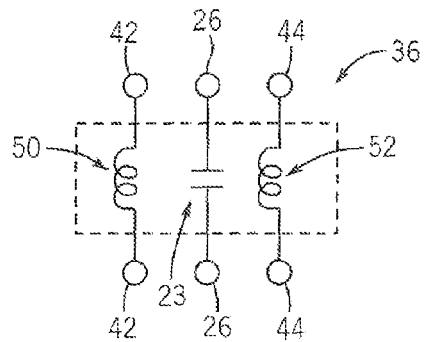
FIG. 10 is a figure similar to that of FIG. 2 showing a simplified electrical schematic of the equivalent circuit of FIG. 9

Referring to FIG. 10 it will be appreciated that the capacitance between terminals 26 will be electrically independent of the transformer primary winding 50 operating between terminals 42 and the transformer secondary winding 52 operating between terminals 44. Further, although the number of turns of each winding 50 and 52 are shown to be approximately the same, it will be appreciated that in general the ratio between the number of turns of the primary winding 50 and secondary winding 52 will vary providing the transformer "turns ratio" defining a voltage or current "step up" or step down". It will also be appreciated that the direction of winding of the primary winding 50 and secondary winding 52 may be the same direction or opposite direction.

It will be understood that other transformer cores 12, including a toroidal core 12 such as shown in FIG. 1 and the spiral core 12 shown in FIG. 8, may also be used for a transformer 36. In addition, the invention contemplates that other traditional transformer core structures may be used including so-called E-I cores and the like while still providing capacitance as taught by this application.

Figure 11:
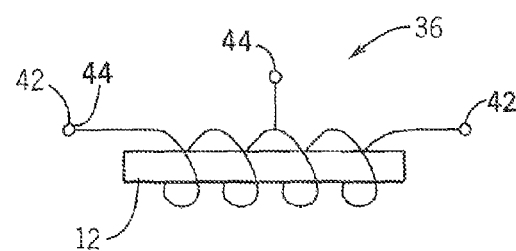
FIG. 11 is a figure similar to that of FIG. 9 showing in simplified form an alternative winding producing an auto transformer.

Referring now to FIG. 11, in one embodiment, the primary winding 50 may share a length of conductor with the secondary winding 52 in the manner of an auto transformer or variable transformer (where the terminal 44 of the secondary winding may slide along the windings to change the relative turns ratio between the primary winding 50 and secondary winding 52).

Embodiments II

Figure 12A:
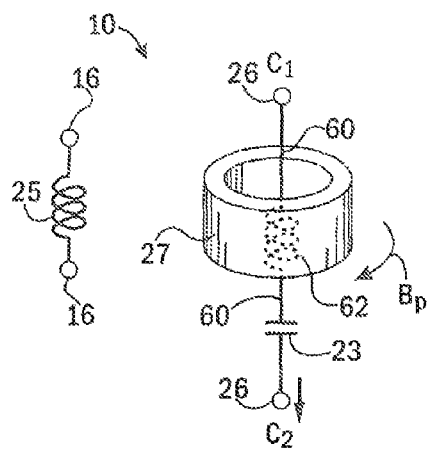
FIG. 12a is an equivalent circuit of the embodiment of FIG. 1 showing an equivalent series inductance promoted by the high permeability core material.

Referring now to FIGS. 1 and 12*a*, current flow from capacitor terminal 26 ($C_1$) to capacitor terminal 26 ($C_2$) will produce a magnetic field Bp encircling the conductors 60 forming a path leading between capacitor terminals 26 according to the right-band rule. Conductor 60 includes generally the conductive material proximate to the core 12 including the conductive plates 22 in those conductors interconnecting the plates 22 to the terminals 26.

For normal capacitor designs, where the conductors 60 connected between the terminals 26 of the capacitance 23 are removed from high permeability material, the energy stored in this magnetic field Bp and hence the inductance caused by the magnetic field Bp may be relatively low. In the present design, however, the conductors 60 communicating current between the terminals 26 are proximate to high permeability material 27 so that they increase the equivalent series inductance 62.

In practice, the high permeability material 27 increases the equivalent series inductance 62 caused by the field Bp to the point of significantly affecting the capacitance of the devices at frequencies less than 100 kilohertz, well within the domain of current solid-state switching elements that may make use of the integrated capacitor inductor unit 10 of the present invention. This inductance 62 will be termed "parasitic" inductance because it differs from the inductance of inductor 25 provided by the loops 18 (for example, shown in FIG. 1) such as is galvanically isolated from the capacitor 23. For two conductors to be galvanically isolated, as used herein, means that there is substantially no ohmic connection between the conductors and hence no path for DC current.

Figure 12B:
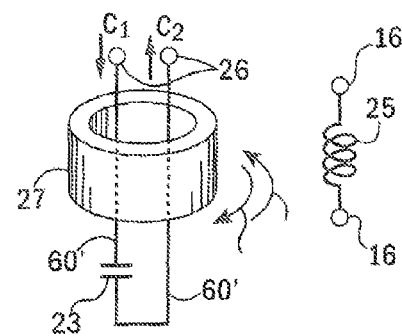
FIG. 12b is a figure similar to FIG. 12a showing a loop-back terminal connection that substantially reduces the equivalent series inductance.

Referring now to FIG. 12*b*, this parasitic inductance 62 may be substantially reduced by employing a loop-back conductor 60' being a portion of conductor 60 that passes backwards with respect to the remainder of conductor 60 (formed of the plates 22 and interconnecting conductors to one of the terminals 26) in close proximity to the high permeability material 27. The flux concentration provided by the high permeability material 27 is the principal cause of the excessive equivalent series inductance 62 (the ESL) of the capacitor 23, and hence the configuration of the loop-back conductor 60' in the vicinity of the high permeability material 27 is of principal interest with portions of the loop-back conductor 60' away from the high permeability materials 27 being of less concern.

In operation, the loop-back conductor 60' provides a countervailing magnetic field to field Bp (depicted as −Bp) that operates to effectively cancel the magnetic energy stored in the high permeability material 27 thereby greatly reducing the parasitic inductance 62.

Figure 13:
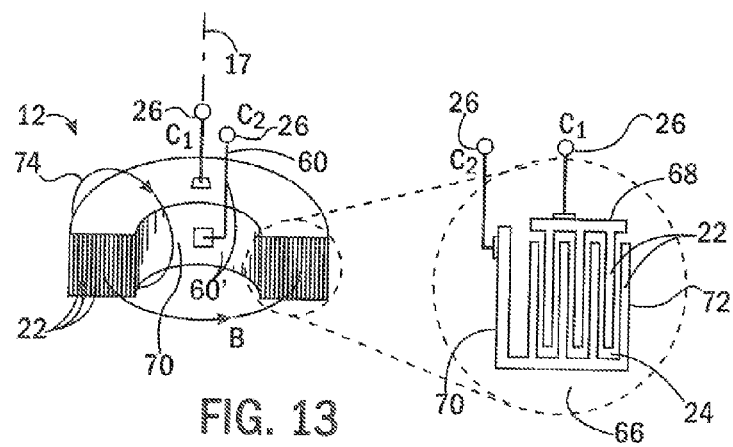
FIG. 13 is a cutaway perspective figure showing a core construction of the embodiment of FIG. 1 incorporating a loop-back terminal together with an enlarged inset showing construction of the loop-back terminal by a central conductive ring.

Referring now to FIG. 13, the loop-back conductor may be implemented in the design of FIG. 1 by passing the conductor 60 leading to terminal $C_2$ backward through the center of the toroid of the core 12 as a loop-back conductor 60' as generally depicted in FIG. 12b. Desirably, but less critically, the conductors 60 to each of the terminals $C_1$ and $C_2$ will be kept closely proximate.

In the embodiment shown in FIG. 13, alternate conductive plates 22 of the core 12 may be connected to a bottom end cap 66 adjacent to a lower base of the toroid of the core 12 and the remaining conductive plates 22 connected to an upper end cap 68 fitting against the upper base of the toroid of the core 12. Part of the loop-back conductor 60' may be formed by a conductive ring 70 fitting against the inner cylindrical bore of the toroid of the core 12 or a conductive ring 72 fitting against the outer periphery of the toroid of the core 12. The upper end cap 68 attaches to one terminal 26 and the lower end cap 66 is extended up the side wall and/or the outer peripheral wall by either or both of the conductive ring 70 or conductive ring 72 to attach at its upper edge to the remaining terminal 26. The loops 18 of the inductor circle the toroid of the core 12 to pass repeatedly through the center of the toroid and around its outer periphery in successive windings, one of which is shown by arrow 74. The result is a magnetic field B generally aligned with a plane of the plates 22 and circling around axis 17.

Figure 14:
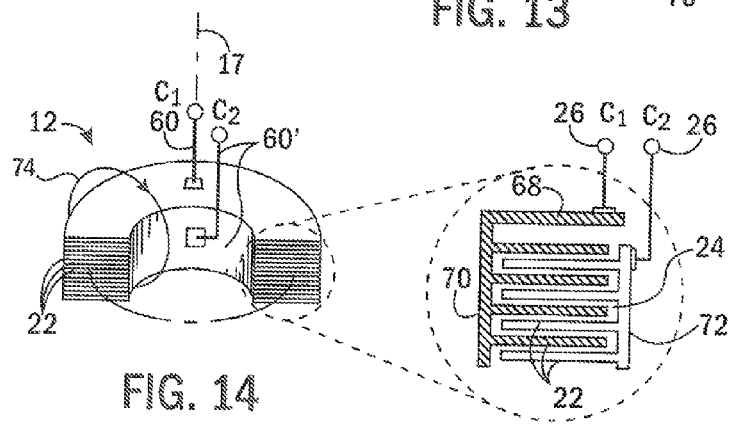
FIG. 14 is a figure similar to FIG. 13 showing alternative lamination orientation of the capacitor layers as may provide for the current loop-back terminal connection.

Referring now to FIG. 14, in an alternative embodiment, the plates 22 of the toriodal core 12 may be generally perpendicular to axis 17. Here alternate conductive plates 22 of the core 12 may be connected to conductive ring 70 fitting against the inner cylindrical bore of the toroid of the core 12, and the remaining conductive plates 22 may be connected to a conductive ring 72 fitting against the outer periphery of the toroid of core 12. An upper end cap 68 fitting against the upper base of the toroid of the core 12 may attach to the inner ring 70 and in turn attach to terminal 26 of $C_1$ near the outer periphery of the toroid of the core 12. The remaining terminal 26 of $C_2$ may attach to the outer ring 72. Here the loop-back conductor 60' is formed by the upper end cap 68 providing a current flow counter to that between the plates 22. The loops 18 of the inductor circle the toroid of the core 12 again passing repeatedly through the center of the toroid and around its outer periphery as shown by arrow 74. The result is a magnetic field B generally aligned with the plane of the plates 22.

Figure 15:
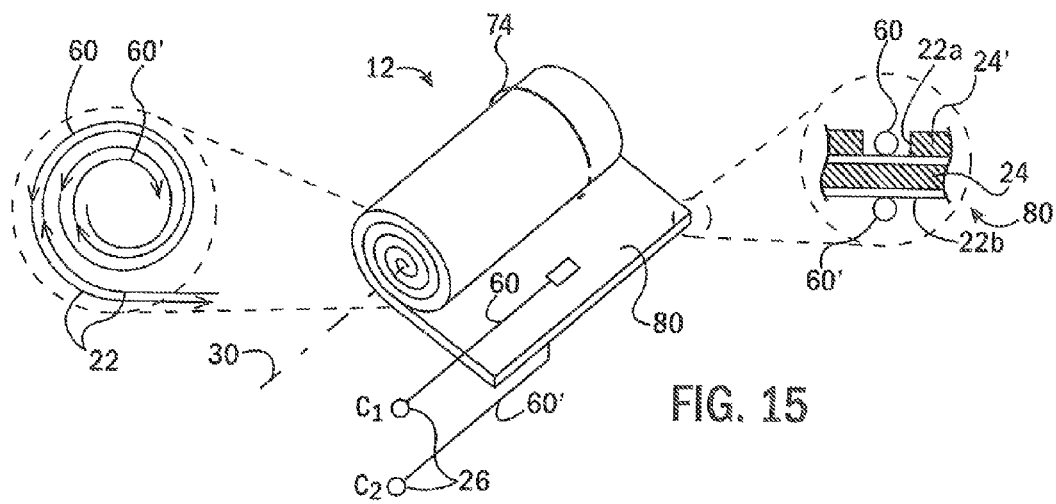
FIG. 15 is a perspective figure showing a core construction of the embodiment of FIG. 8 showing an alternative loop-back connection integrated into the capacitor plates that produces countervailing capacitive current flows.

Referring now to FIG. 15, a loop-back conductor can be implemented in the embodiment of FIG. 8 by constructing the core 12 from a rolled sheet 80 having a flexible insulating layer 24 supporting on its opposite broad faces plates 22a and 22b. An additional insulator 24' may be adhered to the upper plate 22a. One terminal 26 may be attached to the upper plate 22a and the other terminal 26 may be attached to the lower plate 22b by conductors extending parallel to axis 30, one of which provides conductor 60 and the other of which provides loop-back conductor 60'. The axial portions of the conductors 60 and 60' communicating between terminals 26 and the plates 22a and 22b provide a countervailing magnetic field. In addition, the helical plates 22a and 22b provide a similar countervailing magnetic field generation when the sheet 80 is rolled in a spiral around axis 30. As shown in FIG. 8, the loops 18 of the inductor circle the axis 30 as shown by arrow 74. The result is a magnetic field B generally aligned with the plane of plates 22 extending along axis 30.

Figure 16:
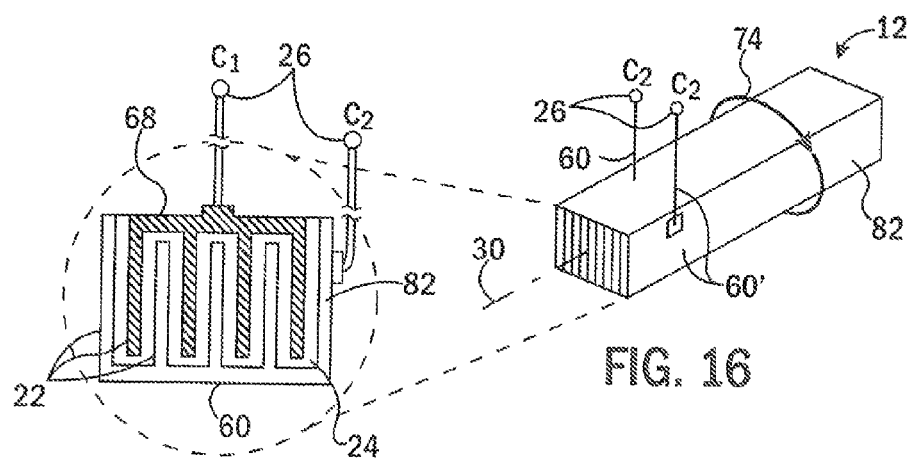
FIG. 16 is a perspective figure showing a core construction of the embodiments of FIGS. 7 and 9 providing current loop-back by side panel connections.

Referring now to FIGS. 7, 9, and 16, alternate conductive plates 22 of the core 12 may be connected to a bottom end cap 66 adjacent to a lower face of the core 12 and the remaining conductive plates 22 connected to an upper end cap 68 fitting against the upper face of the core 12. Part of the loop-back conductor 60' may be formed by a conductive side panel 82 along one or both vertical sides of the core 12 in a direction parallel to the plates 22. An upper edge of this conductive side panel 82 may connect to terminal $C_2$ and terminal $C_1$ may connect to the upper end cap 68. Desirably, but less critically, the conductors 60 to each of the terminals $C_1$ will be kept closely proximate. Leads to the terminals $C_1$ and $C_2$ may also extend along axis 30 so as not to interfere with the loops 18 winding around the core as indicated by arrow 74. The loops produce a magnetic field B generally aligned with the plates 22 along axis 30.

Embodiment III

Figure 17:
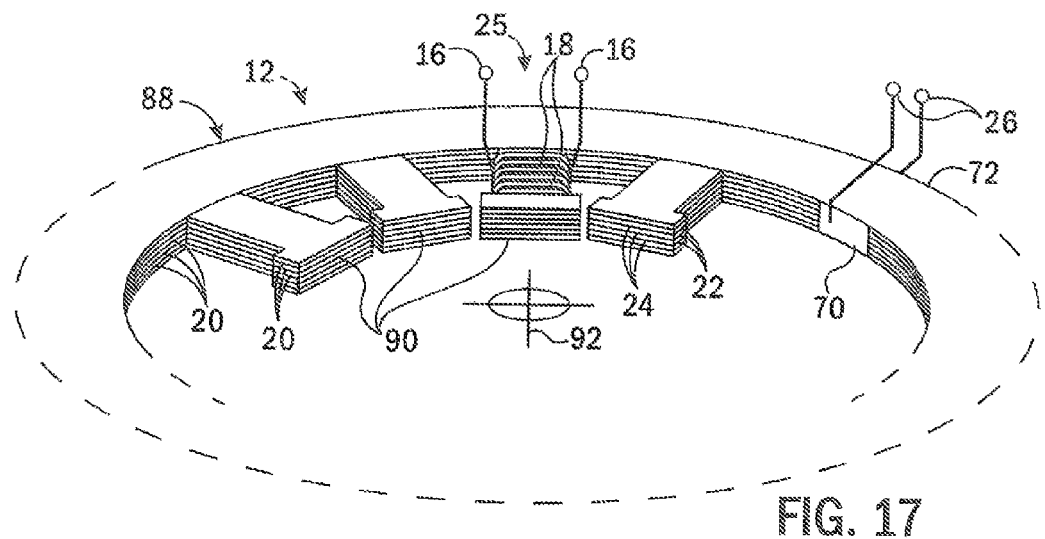
FIG. 17 is a fragmentary perspective view of a motor stator showing use of the present invention to incorporate motor capacitors into the stator structure.

Referring now to FIG. 17, the core 12 in one embodiment may be given a shape providing a planar ring 88 with teeth 90 extending radially inward from an inner diameter of the planar ring 88 as along the plane of the planar ring 88. Each of the teeth 90 may be positioned at an equal angle about an axis 92, the latter defining the center of the ring 88. The ring 88 and teeth 90 may be constructed of a set of layers 20 extending parallel to the plane of the ring 88 and comprising alternating conductive plates 22 and insulators 24 generally in the manner of the construction of the core described in FIG. 14 above. Terminals 26 may be attached to outer ring 72 and inner ring 70 communicating with alternate plates 22 at an inner periphery and outer periphery of the planar ring 88 as discussed above with respect to FIG. 14 to provide capacitor terminals 26.

Each of the teeth 90 may be wound with conductive loops 18 in the manner of a conventional motor stator to provide multiple inductors 25 operating for the purpose of generating a magnetic field for influencing a motor rotor. The capacitance provided by terminals 26 may be used, for example, for a motor starting or phasing capacitor.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A combined inductor and capacitor comprising:
   an inductor providing a conductor extending between a first and second terminal point through multiple loops defining a surrounded volume;
   a capacitor positioned within the surrounded volume and providing a capacitor structure including opposed conductive plates attached by conductors, respectively, to a third and fourth terminal and an insulator separating the opposed conductive plates; and
   a high magnetic permeability material distributed within the capacitor structure comprised of at least one of a ferromagnetic and ferrimagnetic material;
   wherein the conductive plates and conductors are arranged so that current flow between the third and fourth terminals proximate to the high magnetic permeability material provides countervailing canceling magnetic fields within the high magnetic permeability material;
   wherein the capacitor plates form a toroid and include a plurality of plates separated by a plurality of insulators in layers, each layer extending along a first axis parallel to an axis of the toroid and wherein opposite bases the toroid provide first and second conductive end caps;
   wherein a first subset of the plates connects at first edges to the first conductive end cap and a second subset of the plates interleaved with the first subset of plates connect at second edges to the second conductive end cap opposite the first conductive end cap;
   wherein the third terminal connects to the first end cap and the fourth terminal connects via a loop-back conductor to the second end cap, the loop-back conductor passing within the toroid and proximate to the high magnetic permeability material along the first axis toward the first end cap; and
   wherein the multiple loops of the inductor spiral about the toroid to pass repeatedly through the inner diameter of the toroid and around the outer periphery.

2. The combined inductor and capacitor of claim 1 wherein the first and second terminals are galvanically isolated from the third and fourth terminals.

3. The combined inductor and capacitor of claim 1 wherein the plates extend along an axis substantially parallel to magnetic field lines from the inductor.

4. The combined inductor and capacitor of claim 1 wherein the high permeability material is distributed in a plurality of layers in the capacitor structure.

5. The combined inductor and capacitor of claim 4 wherein the high permeability material is iron or an iron alloy with a nonferrous metal coating.

6. The combined inductor and capacitor of claim 1 wherein the high magnetic permeability material is a plurality of granules incorporating inter-granular gaps of low magnetic permeability.

7. The combined inductor and capacitor of claim 1 wherein the conductive plates comprise a material selected from the group consisting of copper and aluminum.

8. The combined inductor and capacitor of claim 1 wherein the insulator is a dielectric material increasing a capacitance of the capacitor by at least a factor of two when compared to the capacitor without the dielectric material.

9. The combined inductor and capacitor of claim 8 wherein the insulator is a polymer material.

10. The combined inductor and capacitor of claim 1 wherein the insulator incorporates a granular high magnetic permeability material selected from the group consisting of ferromagnetic materials and ferrimagnetic materials.

11. A combined inductor and capacitor comprising:
    an inductor providing a conductor extending between a first and second terminal point through multiple loops defining a surrounded volume;
    a capacitor positioned within the surrounded volume and providing a capacitor structure including opposed conductive plates attached by conductors, respectively, to a third and fourth terminal and to insulator separating the opposed conductive plates; and
    a high magnetic permeability material distributed within the capacitor structure comprised of at least one of a ferromagnetic and ferrimagnetic material;
    wherein the conductive plates and conductors are arranged so that current flow between the third and fourth terminals proximate to the high magnetic permeability material provides countervailing canceling magnetic fields within the high magnetic permeability material;
    wherein the high magnetic permeability material operates to increase an inductance of the inductor by a factor of no less than 2 when compared to the inductance of the inductor without the high magnetic permeability material.

12. The combined inductor and capacitor of claim 11 wherein the high permeability material provides a permeability no less than that of nickel.

13. The combined inductor and capacitor of claim 11 wherein the capacitor plates include a plurality of plates separated by a plurality of insulators in a stack extending along a first axis, with the plates extending parallel to a second axis perpendicular to the first axis;
    wherein a first subset of the plates connects at first edges to a first conductive end cap and a second subset of the plates interleaved with the first subset of plates connect at second edges to a second conductive end cap opposite the first conductive panel;
    wherein the third terminal connects to the first end cap and the fourth terminal connects via a loop-back conductor to the second end cap, the loop-back conductor passing proximate to the high magnetic permeability material along the second axis toward the first end cap; and
    wherein the multiple loops of the inductor spiral about an axis perpendicular to the first axis.

14. The combined inductor and capacitor of claim 11 wherein the surrounded volume is substantially toroidal and the capacitor plates extend parallel to an axis of the toroid and wherein first and second conductive end caps provide opposite bases of a toroidal capacitor structure each respectively to interconnect different subsets of the capacitor plates, and
    further including at least one conductive ring conforming to an outer periphery of the toroidal capacitor structure and an inner diameter of the toroidal capacitor structure and electrically connected to the second conductive end cap;

wherein the third terminal connects to the first end cap and the fourth terminal connects to at least one conductive ring; and wherein the multiple loops of the inductor spiral about the toroid to pass repeatedly through the inner diameter of the toroid and around the outer periphery.

15. The combined inductor and capacitor of claim 11 wherein the surrounded volume is substantially toroidal and the capacitor plates extend perpendicularly to an axis of the toroid and wherein the first conductive end cap is a conductive ring conforming to an outer periphery of a toroidal capacitor structure and the second conductive end cap is a conductive ring conforming to an inner diameter of the toroidal capacitor structure; and further including at least one conductive base plate conforming to at least one base of the toroidal capacitor structure and electrically connected to at least one of the end caps to communicate electricity with at least one of the third and fourth terminals; and wherein the multiple loops of the inductor spiral about the toroid to pass repeatedly through the inner diameter of the toroid and around the outer periphery.

16. The combined inductor and capacitor of claim 11 wherein the capacitor plates include at least two conductive plates separated by an insulator rolled in a spiral about first axis to create a laminated structure with laminations separated along lines of radius from the first axis wherein the third terminal connects to at least one plate and the fourth terminal connects to at least a second plate separated from the first plate by the insulator;

whereby instantaneous current flow in the first and second plates provide countervailing canceling magnetic fields; and wherein the multiple loops of the inductor spiral about the first axis.

17. The combined inductor and capacitor of claim 11 wherein the inductor provides an inductance of at least 0.01 µH and the capacitor provides a capacitance of at least 0.0001 µF.

* * * * *